United States Patent
Buck, Jr.

(10) Patent No.: US 12,093,783 B1
(45) Date of Patent: Sep. 17, 2024

(54) SUPERADDITIVITY FOR REMOTE SENSING AND COMMUNICATION

(71) Applicant: LOCKHEED MARTIN CORPORATION, Bethesda, MD (US)

(72) Inventor: Joseph Robert Buck, Jr., Superior, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 876 days.

(21) Appl. No.: 17/187,627

(22) Filed: Feb. 26, 2021

Related U.S. Application Data

(60) Provisional application No. 63/007,862, filed on Apr. 9, 2020.

(51) Int. Cl.
| | |
|---|---|
| *H04B 10/70* | (2013.01) |
| *B82Y 10/00* | (2011.01) |
| *G06N 10/00* | (2022.01) |
| *H01S 3/00* | (2006.01) |

(52) U.S. Cl.
CPC .............. *G06N 10/00* (2019.01); *B82Y 10/00* (2013.01); *H01S 3/0057* (2013.01); *H04B 10/70* (2013.01)

(58) Field of Classification Search
CPC ...................... H04B 10/60–6973; H04B 10/70
See application file for complete search history.

(56) References Cited

U.S. PATENT DOCUMENTS

| | | | |
|---|---|---|---|
| 10,050,719 B1 * | 8/2018 | Ohkawa | H04B 10/70 |
| 2012/0076503 A1 * | 3/2012 | Habif | G01S 7/4912 |
| | | | 398/140 |
| 2015/0055961 A1 * | 2/2015 | Meyers | G06N 10/00 |
| | | | 398/140 |
| 2018/0149476 A1 * | 5/2018 | Huang | H04B 10/70 |
| 2021/0021339 A1 * | 1/2021 | Lundberg | H04B 10/70 |
| 2021/0159987 A1 * | 5/2021 | Zhang | H04B 10/29 |

OTHER PUBLICATIONS

Slodička, Lukáš, et al. "Free space interference experiments with single photons and single ions." Engineering the Atom-Photon Interaction: Controlling Fundamental Processes with Photons, Atoms and Solids (2015): 99-124. (Year: 2015).*

* cited by examiner

*Primary Examiner* — Nathan M Cors
(74) *Attorney, Agent, or Firm* — BAKERHOSTETLER

(57) ABSTRACT

A system for superadditivity for remote sensing and communication includes coupling optics to direct several input pulses received over a communication channel to an interaction medium. A probe beam entering the interaction medium at an angle performs state preparation and manipulation. A detector reads the output light of the interaction medium. Orthogonality states of symbols represented by the plurality of input pulses are affected by the communication channel, and the interaction medium provides the output light via local entanglement of the plurality of input pulses and the probe beam.

20 Claims, 17 Drawing Sheets

SUPERADDITIVITY FOR REMOTE SENSING AND COMMUNICATION

CROSS-REFERENCES TO RELATED APPLICATIONS

This application claims priority to and the benefit of U.S. Provisional Patent Application No. 63/007,862, filed Apr. 9, 2020, which is hereby incorporated by reference in its entirety.

STATEMENT REGARDING FEDERALLY SPONSORED RESEARCH OR DEVELOPMENT

Not applicable.

FIELD OF THE INVENTION

The present invention generally relates to remote sensing and communications technology, more particularly to superadditivity for remote sensing and communication.

BACKGROUND

Beyond quantum computation, practical quantum storage devices will also allow improvements in classical sensing and communication systems by providing a means of implementing superadditivity protocols. Superadditivity is a technique for obtaining improved sensitivity for measurements of very weak signals by exploiting quantum entanglement within a receiver. In this way, collective measurements can provide a capacity larger than that described by Shannon's theorem, which translates into improved detection sensitivity for weak signals. While there are several methods of improving sensitivity by using transmission of nonclassical light, those techniques are not typically robust in the presence of large channel losses. In this way, quantum sensing protocols can provide improvements without relying on remote sharing of entanglement.

SUMMARY

According to some aspects, the subject technology is directed to superadditivity for remote sensing and communication. The subject technology achieves the maximal information transfer rate possible when information is encoded into quantum systems via the preparation of one or another of two nonorthogonal states.

In one or more aspects, a system directed to superadditivity for remote sensing and communication includes coupling optics to direct several input pulses received over a communication channel to an interaction medium. A probe beam entering the interaction medium at an angle performs state preparation and manipulation. A detector reads out output light of the interaction medium. Orthogonality states of symbols represented by the plurality of input pulses are affected by the communication channel, and the interaction medium provides the output light via local entanglement of the plurality of input pulses and the probe beam.

In other aspects, a method for superadditivity in communication includes directing a number of input pulses received over a communication channel to an interaction medium. The method also includes using a probe beam to perform state preparation and manipulation in the interaction medium by allowing local entanglement of the input pulses and the probe beam. The method further includes reading out, by a detector, output light of the interaction medium. The communication channel comprises a noisy and lossy channel that affects orthogonality states of symbols represented by the plurality of input pulses.

In other aspects, a method for superadditivity in remote sensing includes directing a plurality of input pulses through a communication channel to a target. The method also includes receiving from the target over the communication channel a number of reflected pulses. The method further includes directing the reflected pulses to an interaction medium and using a probe beam to perform state preparation and manipulation of the reflected pulses in the interaction medium by allowing local entanglement of the reflected pulses and the probe beam. A detector is used in reading out the output light of the interaction medium. The communication channel is a noisy and lossy channel that affects orthogonality states of symbols represented by the input pulses.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
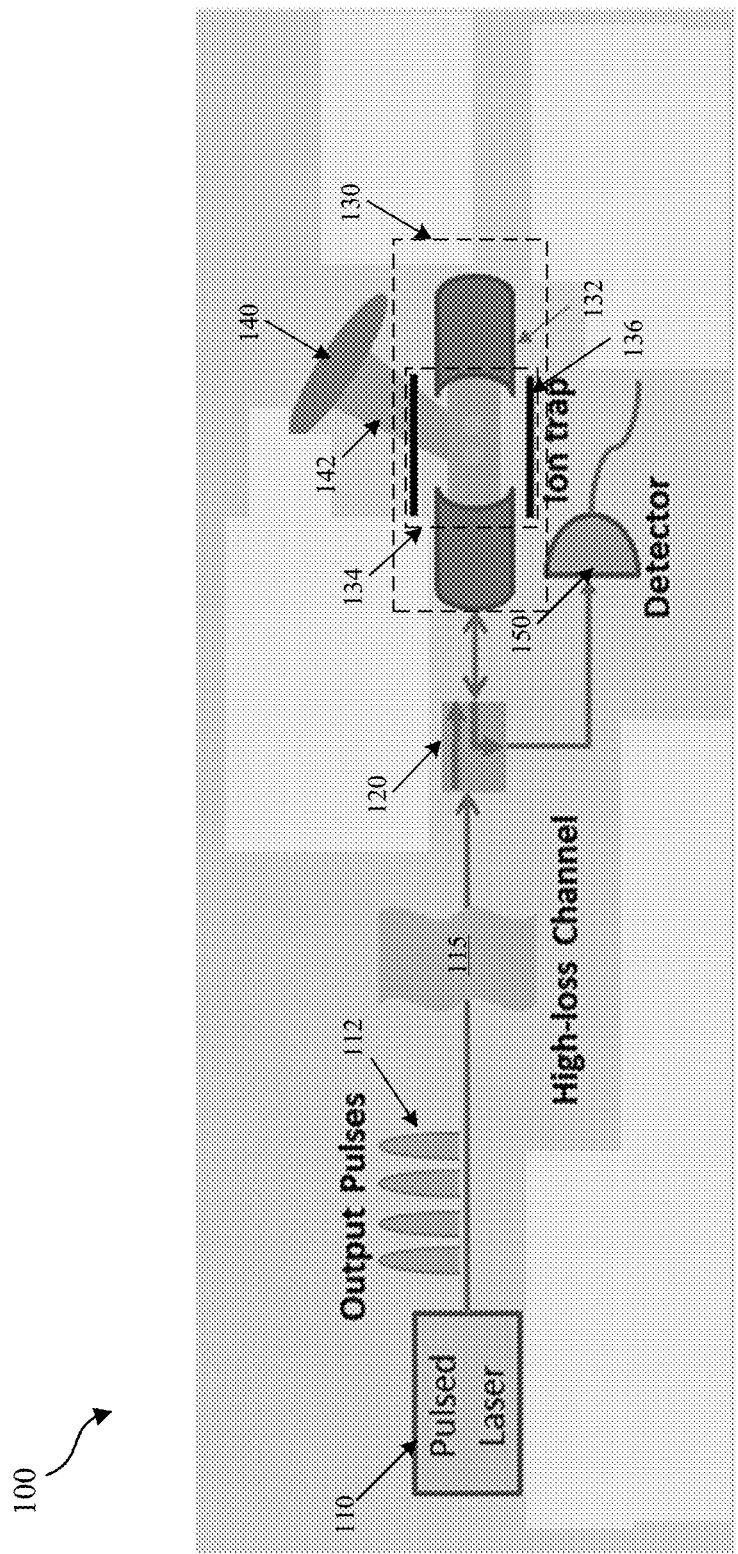
FIG. 1 is a schematic diagram illustrating an example of a system implementing superadditivity for remote sensing and communication, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

According to various aspects of the subject technology, methods and configurations for providing superadditivity of quantum channel capacities for remote sensing and communication are disclosed. In some aspects, the subject technology is directed to achieving the maximal information transfer rate possible by encoding information into quantum systems via preparation of one or another of two nonorthogonal states. This might at first seem like a questionable thing to consider, as, for transmissions through a noiseless medium, the maximal transfer rate or capacity of one bit/transmission is clearly achieved only with orthogonal alphabets. This is because nonorthogonal preparations cannot be identified with complete reliability. However, there are instances in which it is neither practical nor desirable to use such an alphabet. The most obvious example is when a simple laser transmitter is located a great distance from the receiver. The receiver's field will take on the character of a very attenuated optical coherent state. Because the states become less orthogonal as the power is attenuated, one is confronted with precisely the issue considered here. In this case, one is typically stuck with trying to extract information from quantum states that are not only nonorthogonal but almost completely overlapping.

The practical method in many situations for compensating for very weak signals is to invest in elaborate receivers. While others have explored using remote sharing of nonclassical light and entanglement to improve the channel capacity, this is impractical for lossy channels.

The disclosed solution uses decoding of nonorthogonal signals on separate transmissions, with local entanglement used within the receiver only. Traditional signal-processing methods have only considered fixed decoding measurements performed on the separate transmissions. Taking into account the intrinsic noise generated by the quantum measurement, in the traditional approach one is left with a basic problem of classical information theory, which is coding for a discrete memoryless channel. Quantum mechanics, however, allows for more possibilities than this. In exploiting collective measurements on blocks of transmitted signals, it is possible to achieve a greater capacity than the classical limit by using what is referred to as superadditivity of quantum channel capacities. This is an effect that does not exist classically. The physics behind this effect relies on a kind of nonlocality dual to the famous one exhibited by entangled quantum systems through Bell inequality violations. More precisely, a communication rate R is said to be achievable if, in k transmissions, there is a way of writing 2*R*k messages with the nonorthogonal alphabet so that the probability of a decoding error goes to zero when k goes to infinity. The communication rate R signifies the number of bits per transmission that can be conveyed reliably from the transmitter to the receiver in the asymptotic limit. Clearly, the rates that can be achieved will depend on the class of coding used for the messages and the class of quantum measurements allowed at the receiver. The capacity $C_n$ is defined to be the supremum of all achievable rates, where n is the number of transmissions to be saved up before performing a measurement. The meaning of superadditivity is simply that $C_n > C_1$, where the inequality is strict and $C_1$ is the capacity of one bit/transmission. The basic principle is that the ability to perform entangled measurements within the receiver allows the Von Neumann measurement basis set to be rotated in such a way as to minimize the projections on vacuum noise. This allows one to overcome the shot noise limit in an optical remote sensing application where the system is limited in the amount of light that can be transmitted.

The subject technology combines several techniques to allow the classical performance metrics to be overcome even while using a classical transmitter and channel. Each of the features below is meant to encompass different optimization for each of the applications. Specifically, the applications and protocols of the subject disclosure include (1) use of a quantum storage device to implement superadditivity protocols for optical remote sensing, (2) use of a quantum storage device to implement superadditivity protocols for optical communication, (3) use of a quantum storage device to implement superadditivity protocols for radio frequency (RF) communication, (4) use of a quantum storage device to implement superadditivity protocols for RF remote sensing, (5) long-range optical remote sensing, (6) low probability-of-intercept optical remote sensing, (7) long-range optical communication, (8) low probability-of-intercept optical communication, (9) low probability-of-intercept RF remote sensing, (10) long-range RF communication, (11) low probability-of-intercept RF communication, (12) optical transfer protocol for an ion-based trap chip, (13) optical transfer protocol for a neutral atom-based device, (14) optical transfer protocol for a superconducting-based trap chip, and (15) optical transfer protocol for a topological quantum bit (qubit) device.

Most research groups exploring methods to exploit entanglement for improvements in sensing and communication rely on either remotely sharing entanglement or transmitting nonclassical light. These protocols not only may lack sufficient robustness for even several dB of channel loss, but also are completely impractical for the large channel losses (reduction of $10^{15}$ in many applications) in real-world, long-range sensing and communication scenarios. The channel loss is a Poisson process and quickly degrades non-classical light.

This subject disclosure uses local entanglement at the receiver only, with coherence requirements set by the pulse-to-pulse repetition rate instead of the time between the two locations. For weak coherent states, this allows significant improvements in remote-sensing sensitivity and channel capacity with even several qubits of storage. This is an application that can exploit the near-to-market ion trap chips long before they are practical for computation applications.

FIG. 1 is a schematic diagram illustrating an example of a system 100 implementing superadditivity for remote sensing and communication, according to certain aspects of the disclosure. The system 100 is a transceiver that includes a transmitter consisting of a pulsed laser source 110 and a receiver consisting of a coupling optics 120, an interaction medium such as a cavity 130, a probe (auxiliary) beam source 140 and a detector 150. The pulsed laser source 110 generates sets of sequential laser pulses 112 for transmission through a communication channel 115. The sequential laser pulses 112 may, for example, include 10 pulses that are state-prepared and timing-controlled pulses, as will be discussed in more detail herein. The communication channel 115 may be a noisy (e.g., turbulence, background light and dark current) and high-loss channel that can significantly affect the states of the transmitted sequential laser pulses 112, for example, by affecting the orthogonality of the symbols that form the input signals of the receiver.

The disclosed receiver is capable of decoding the nonorthogonal symbols on the separate transmissions using local entanglement within the receiver. In some aspects, the coupling optics 120 can be an optical circulator that directs the input signals (laser pulses) to the cavity 130 for quantum bit generation. In one or more aspects, the cavity 130 may be a high-finesse, small-mode volume cavity including mirrors 132 and an ion trap 134. The mirrors 132 can be dielectric mirrors formed of a low-loss, transparent conductor. The ion trap 134 is a Fabry-Perot cavity and includes electrodes 136, which are coupled to an RF source and operate as the power source for the ion trap 134. The number of ions in the ion trap 134 is the same as the number of the sequential laser pulses 112. The probe (auxiliary) beam source 140 generates a probe beam 142 that is used for state preparation and manipulation. The trapped ions are responsible for entanglement of the input signals and the probe beam 142 to generate a number of qubits equal to the number of trapped ions. The generated qubits are optical symbols with recovered orthogonality that are scattered off the trapped ions and can escape to the coupling optics 120 (circulator) and be circulated to the detector 150 for readout.

In some aspects, the wavelength of the probe beam 142 is consistent with the pulse repetition rate of the sequential laser pulses 112, which can be in the order of several MHz. The manipulation is performed by the probe beam and the RF signal applied to the ion trap 134. The coherence time associated with the qubits are within usec time scale, which is much smaller than the coherence time required by quantum computation. The type of ions used in the ion trap depends on the wavelength of the desired optical transitions. In some aspects, the used ions can be ytterbium ions. In one or more implementations, different types of cavities such as photonic bandgap material cavities may be used. The manipulation by the probe beam follows an algorithm that will be discussed herein.

Figure 2:
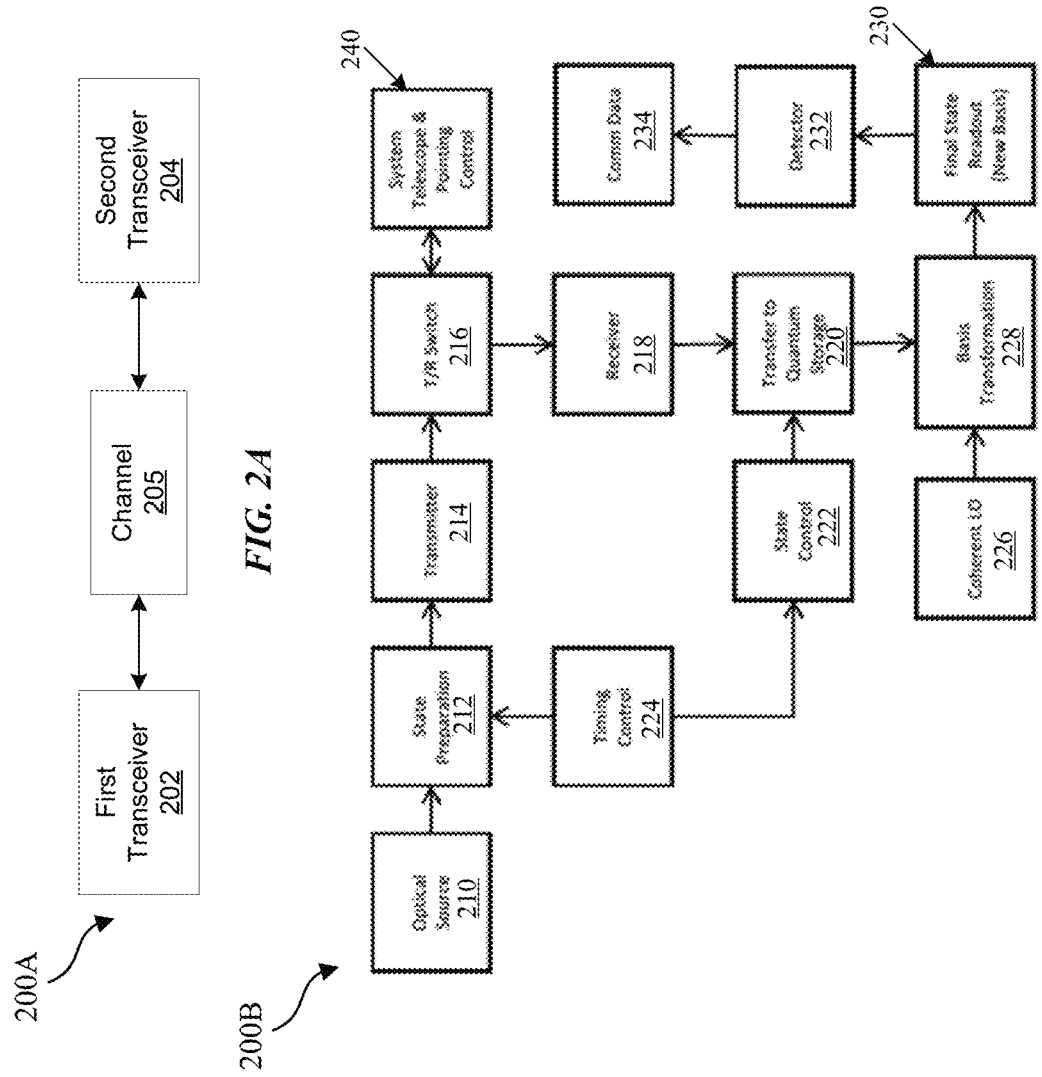
FIGS. 2A and 2B are block diagrams illustrating examples of two-way communication systems.

FIGS. 2A and 2B are block diagrams illustrating examples of two-way communication systems. FIG. 2A shows a high-level block diagram of a two-way communication system 200A, which includes a first transceiver 202, a communication channel 205 and a second transceiver 204. The first transceiver 202 (e.g., 100 of FIG. 1) communicates with the second transceiver 204 through the communication channel 205, which is a high-loss channel. The second transceiver 204 can be similar to the first transceiver 202, for which an example implementation 200B is shown in FIG. 2B.

The example implementation 200B shown in FIG. 2B includes an optical source 210, a state preparation block 212, a transmitter 214, a transmit/receive (T/R) switch 216, a receiver 218, a transfer to quantum storage block 220, a state control block 222, a timing control block 224, a coherent local oscillator (LO) block 226, a basis transformation block 228, a final state readout (new basis) block 230, a detector 232, a communication data output 234 and a system telescope and pointing control 240. There are many implementations for the optical source 210—for example, weak coherent state, squeezed states, pulse-selected photon generation and photon turnstile optical sources. The state preparation block 212 implements the desired word (sequence of alphabet basis) based on the alphabet (symbols) within each laser pulse of the optical source 210. The transmitter 214 consists of system components needed to control the spatial mode of the prepared states. The T/R switch 216 can be implemented using either a non-polarizing or polarizing beam splitter, with or without a waveplate, or it could be based on a Faraday crystal configuration. The receiver 218 consists of all components necessary to shape the received pulses for transfer to a storage device. The transfer to quantum storage block 220 transfers the shaped pulses received from the receiver 218 to a quantum storage (e.g., the cavity 130 of FIG. 1). The state control block 222 controls which bit that each input pulse is routed to, as well as prepares the bit to receive the pulse. The timing control block 224 controls the state preparation to implement the desired word based on the alphabet within each laser pulse, and also provides input for the state control block 222.

The basis transformation block 228 receives coherent LO signals from the coherent LO block 226 and implements the transformation into the readout basis by leveraging the coherent LO signals. The final state readout block 230 controls the readout sequence to output the results of the readout basis transformation. The detector 232 routes the results to the communication data output 234, which provides the decoded word with improved signal fidelity (and increased channel capacity) as compared to the equivalent classical transceiver.

Figure 3:
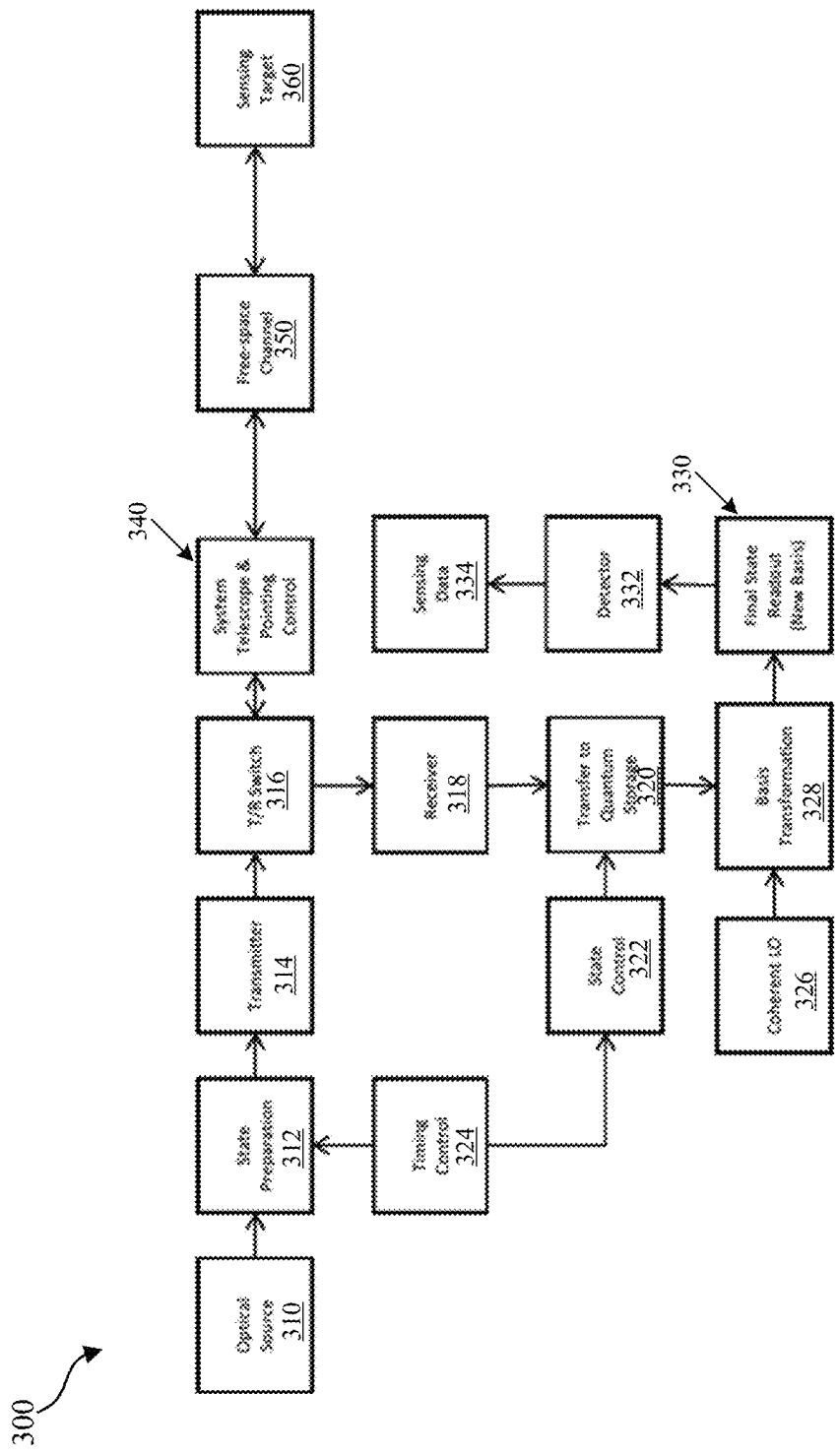
FIG. 3 is a block diagram illustrating an example of a system implementing superadditivity for remote sensing, according to certain aspects of the disclosure.

FIG. 3 is a block diagram illustrating an example of a system 300 implementing superadditivity for remote sensing, according to certain aspects of the disclosure. The system 300 includes an optical source 310, a state preparation block 312, a transmitter 314, a T/R switch 316, a receiver 318, a transfer to quantum storage block 320, a state control block 322, a timing control block 324, a coherent LO block 326, a basis transformation block 328, a final state readout (new basis) block 330, a detector 332, a sensing data block 334, a system telescope and pointing control 340, a communication channel 350 and a sensing target 360. The optical source 310, the state preparation block 312, the transmitter 314, a T/R switch 316, the receiver 318, the transfer to quantum storage block 320, the state control block 322, the coherent LO block 326, the basis transformation block 328, the final state readout (new basis) block 330 and the detector 332 are similar to the corresponding blocks of FIG. 2B and description of these blocks is skipped herein for brevity. The timing-control block 324 uses the state preparation block 312 to implement the desired encoded signal for the sensing parameter under consideration, with the alphabet chosen for the signal. The telescope and pointing control 340 can set the required aperture for the transmit and receive beam (in a mono-static configuration) or separately for each in a bi-static configuration. The pointing control can also handle the lead/lag pointing for the transmit and receive pulses based on the relative motion of the platforms and finite speed of light. The detector 332 routes the results to a sensing data block 334, which provides the decoded sensing parameter with improved signal fidelity (and increased channel capacity) as compared to the equivalent classical transceiver. The communication channel 350 is a free-space channel and includes all of the impacts of propagation from one platform to the other. The sensing target 360 reflects the received light as a reflected signal that is passed through the free-space channel 350, the system telescope and pointing control block 340 and the T/R switch 316 to the receiver 318. The reflected signal can include range, reflectivity, velocity, phase offset, and spectral content, and can include channel properties between the sensor and the target.

Figure 4A:
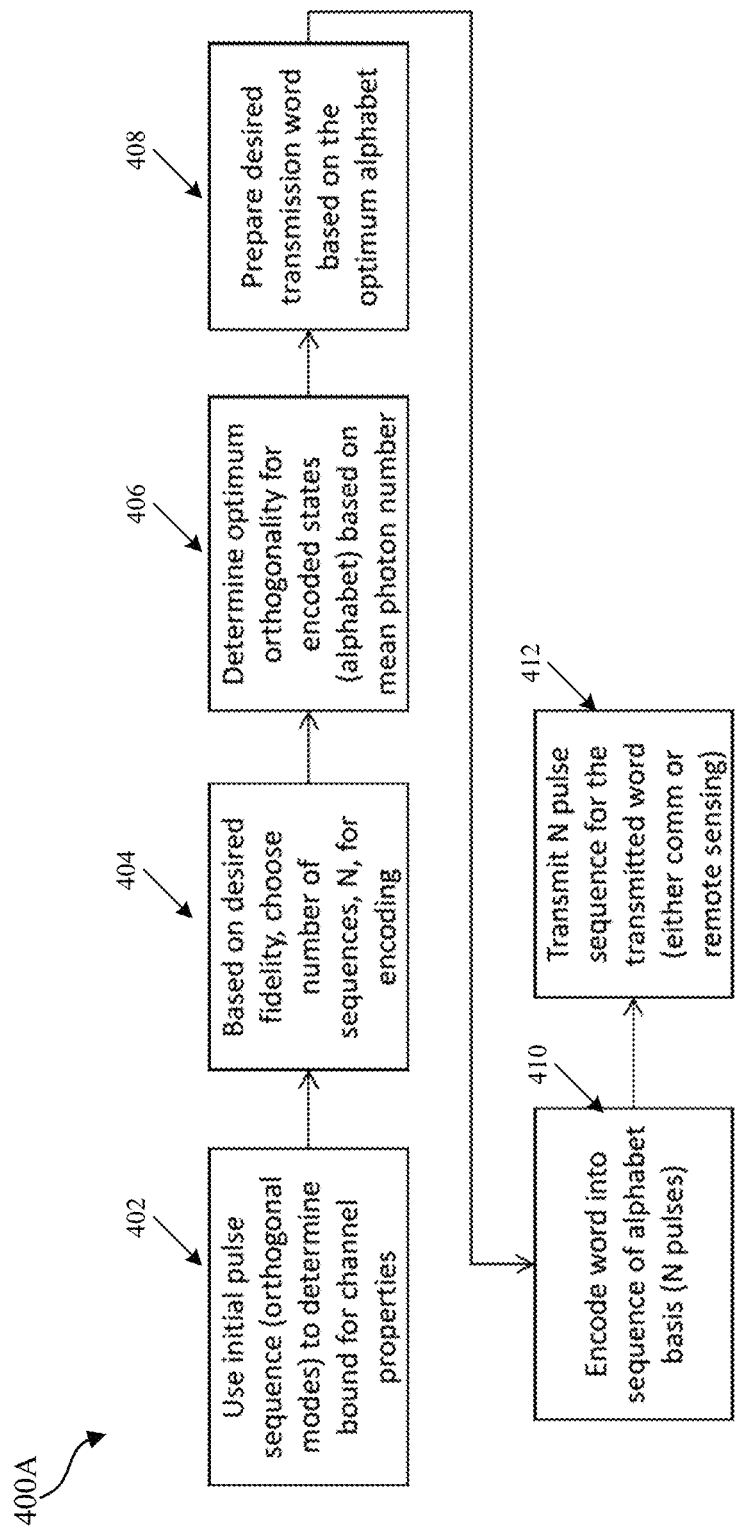
FIG. 4A is a flow diagram illustrating an example of a method for state preparation, according to certain aspects of the disclosure.

FIG. 4A is a flow diagram illustrating an example of a method 400A for state preparation, according to certain aspects of the disclosure. The method 400A is a protocol for state preparation, including for determining the number of pulses to use for the alphabet basis, and applies to both communication and remote-sensing applications. The method 400A starts with operation block 402, where the bound for channel properties is determined using the initial pulse sequences (e.g., 112 of FIG. 1) that are in orthogonal modes. At operation block 404, the number of pulses (N) per sequence for encoding is chosen based on a desired fidelity. At operation block 406, the optimum orthogonality for the encoded states (alphabets) is determined based on mean number of photons. Next, at operation block 408, the desired transmission word is prepared based on the optimum alphabet. Then, at operation block 210, the prepared desired word is encoded (e.g., in the cavity 130 of FIG. 1) into a sequence of alphabet basis (N pulses). Finally, at operation block 412, the N-pulse sequence for the transmitted word (in communication or remote sensing) is transmitted. In the remote-sensing application, the desired signal and channel properties determine the optimum transmission word.

Figure 4B:
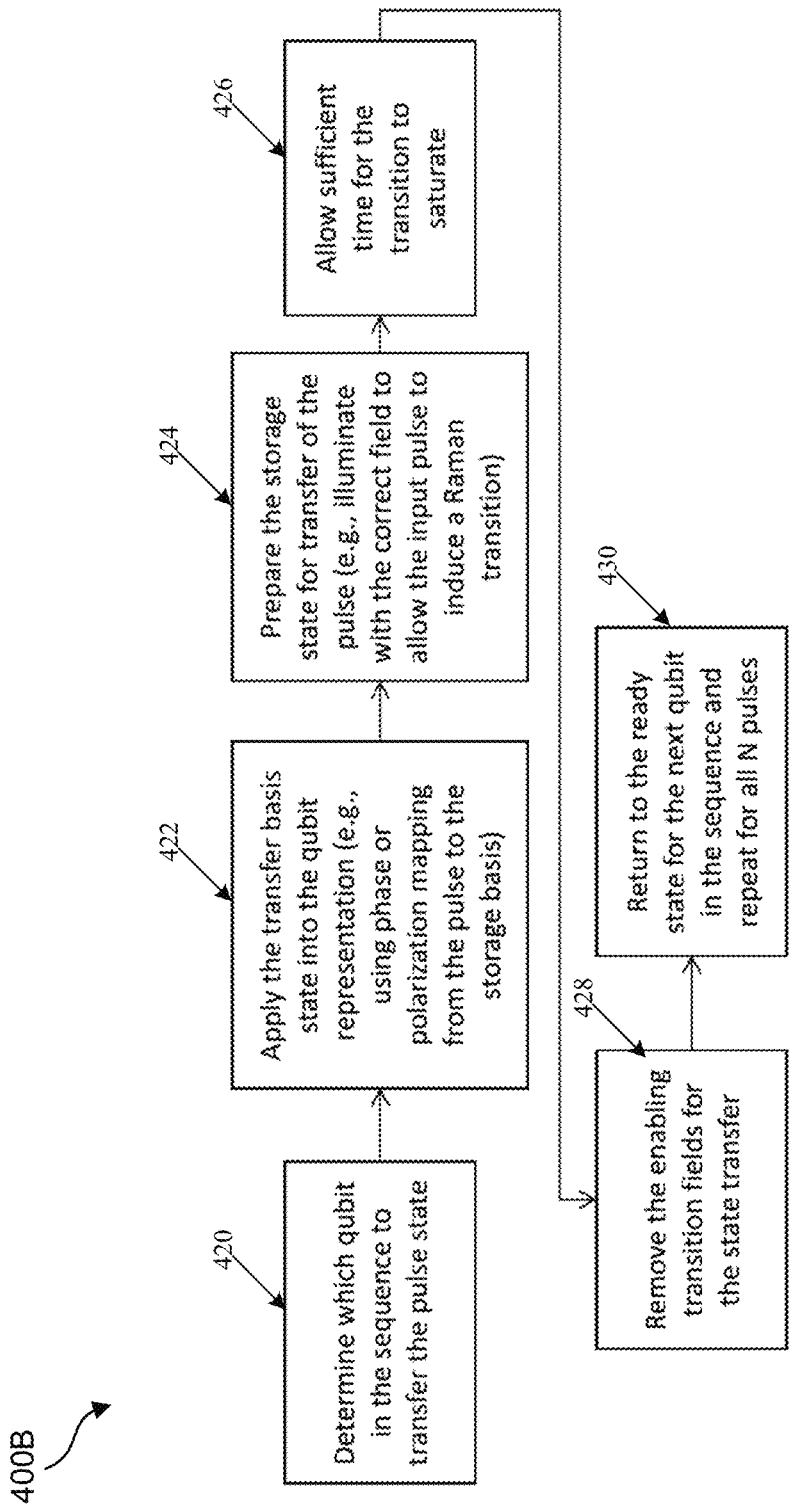
FIG. 4B is a flow diagram illustrating an example of a method for state control and transfer to quantum bit storage, according to certain aspects of the disclosure.

FIG. 4B is a flow diagram illustrating an example of a method 400B for state control and transfer to qubit storage, according to certain aspects of the disclosure. The method 400B shows the protocol for controlling the storage implementation for transfer of the pulses to the qubits. This is the control sequence needed to store the received signal (for both communication and remote sensing) prior to performing the transformation needed to improve the signal fidelity. The method 400B starts with operation block 420, where it is determined which qubit in the sequence is used to transfer the pulse state. At operation block 422, the transfer-basis state is applied into the qubit representation (e.g., using phase or polarization mapping from the pulse to the storage basis). Next, at operation block 424, the storage state for transfer of the pulse is prepared (e.g., in the ion trap 134 of FIG. 1, by illuminating with the correct transition RF field to allow the input pulse to induce a Raman transition). At operation block 426, enough time duration is allowed for the Raman transition to saturate. Then, at operation block 428, enabling transition RF fields for the state transfer are removed. Finally, at operation block 430, the transition RF field is returned to the ready state for the next qubit in the sequence and the process is repeated for all the N pulses. In the remote-sensing application, the desired signal and channel properties determine the optimum transmission word.

Figure 4C:
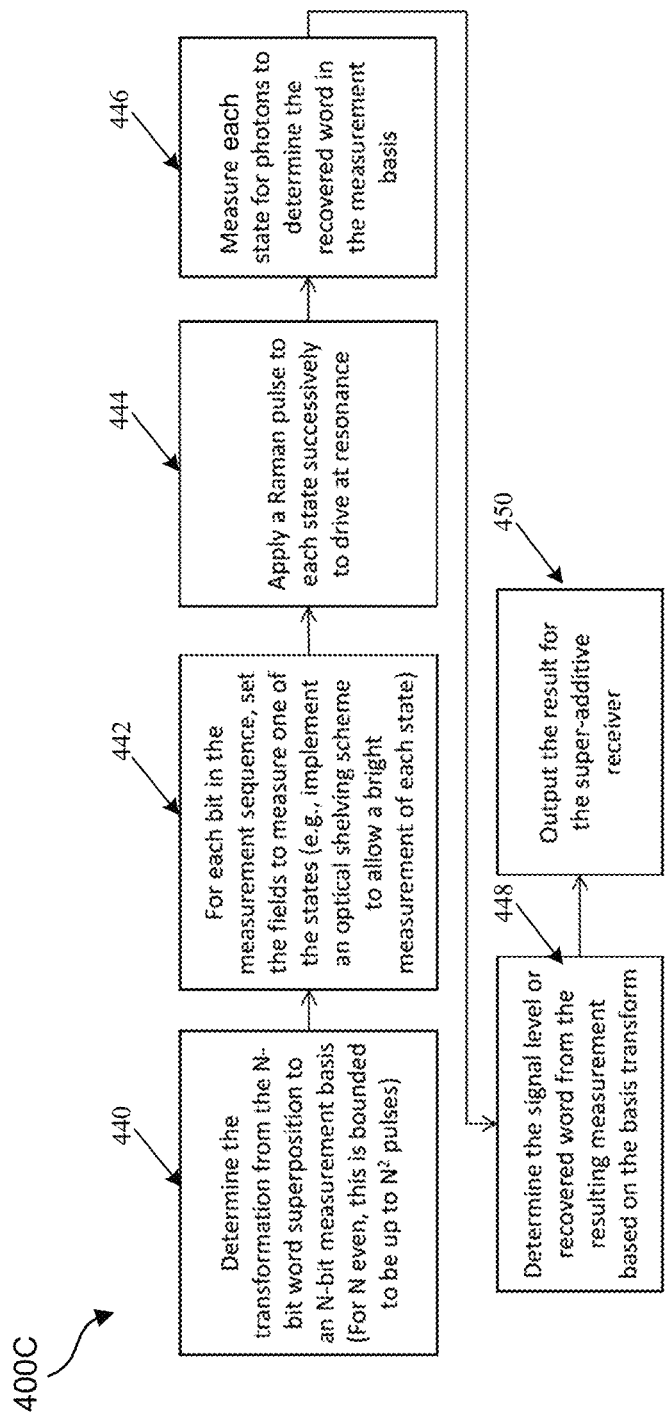
FIG. 4C is a flow diagram illustrating an example of a method of basic transformation and state readout, according to certain aspects of the disclosure.

FIG. 4C is a flow diagram illustrating an example of a method 400C basic transformation and state readout, according to certain aspects of the disclosure. The method 400C shows the protocol used for both the basis transformation and state readout. The example shown is for optical modes (i.e., levels in an ion or atom); however, the mechanism applies to any qubit transition. The generalized bound for the transformation uses at most $N^2$ steps, where N is the number of qubits and transmitted/received storage pulses, with N being rounded up to an even integer. For example, if the protocol were for three pulses, then the most steps needed would be 16. This sequence allows a simple measurement of the state readout for decoding the signal. The method 400C starts at operation block 440, where the transformation from the N-bit word superposition to an N-bit measurement basis (for even N, this is bounded to be up to $N^2$ pulses) is determined. At operation block 442, for each bit in the measurement sequence, the RF field is set to measure one of the states (e.g., implement an optical-shelving scheme to allow a bright measurement of each state). At operation block 444, a Raman transition pulse is applied to each state successively to drive at resonance. Next, at operation block 446, each state of the photons is measured to determine the recovered word in the measurement basis. Then, at operation block 448, the signal level or recovered word from the resulting measurement is determined based on the basis transform. Finally, at operation block 450, the result of the superadditive receiver is outputted.

Figure 5A:
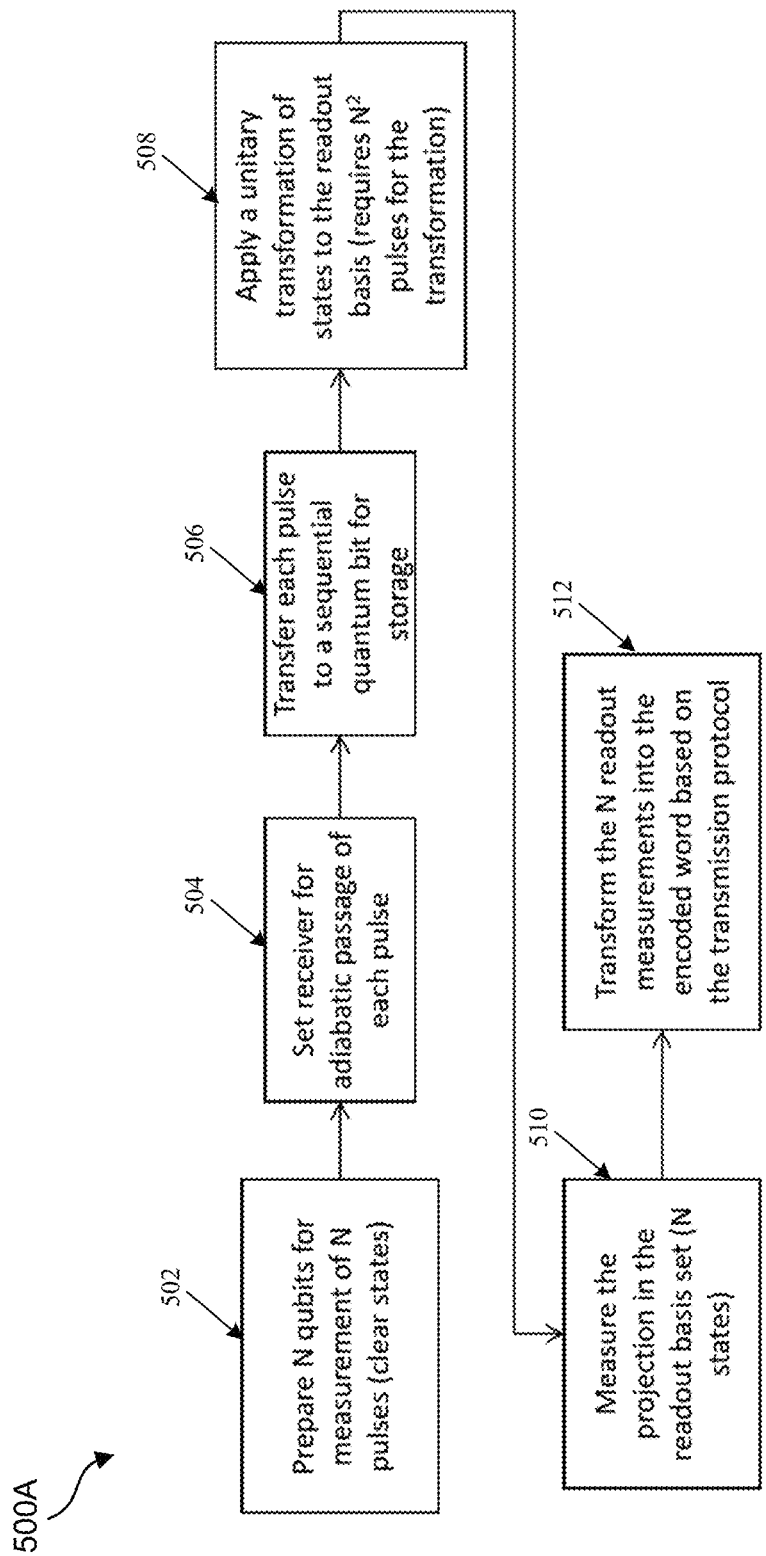
FIG. 5A is a flow diagram illustrating an example of protocol for decoding information from multiple pulses for communication applications, according to certain aspects of the disclosure.

FIG. 5A is a flow diagram illustrating an example of protocol 500A for decoding information from multiple pulses for communication applications, according to certain aspects of the disclosure. The protocol 500A can be implemented with many embodiments of the quantum storage, with the physical embodiment (e.g., ions, atoms, superconducting, phonons) of the qubit setting the requirements to achieve the adiabatic transfer of each pulse to the storage bit. The coherence time requirements are set by the time for receiving the N pulses, performing the unitary transformation steps, and then reading each bit in the readout basis sequence. For communication applications, this time is orders of magnitude lower than for quantum computation applications. The protocol 500A starts at operation block 502, where N qubits are prepared for measurement of N pulses (clear states). At operation block 504, the receiver (e.g., 318 of FIG. 3) is set for an adiabatic passage of each pulse. At operation block 506, each pulse is transferred to a sequential qubit for storage. Next, at operation block 508, a unitary transformation of states to the readout basis is applied (this requires $N^2$ pulses for the transformation). Then, at operation block 510, the projection is measured in the readout basis set (N states). Finally, at operation block 512, the N readout measurements are transformed into the encoded words based on the transmission protocol.

Figure 5B:
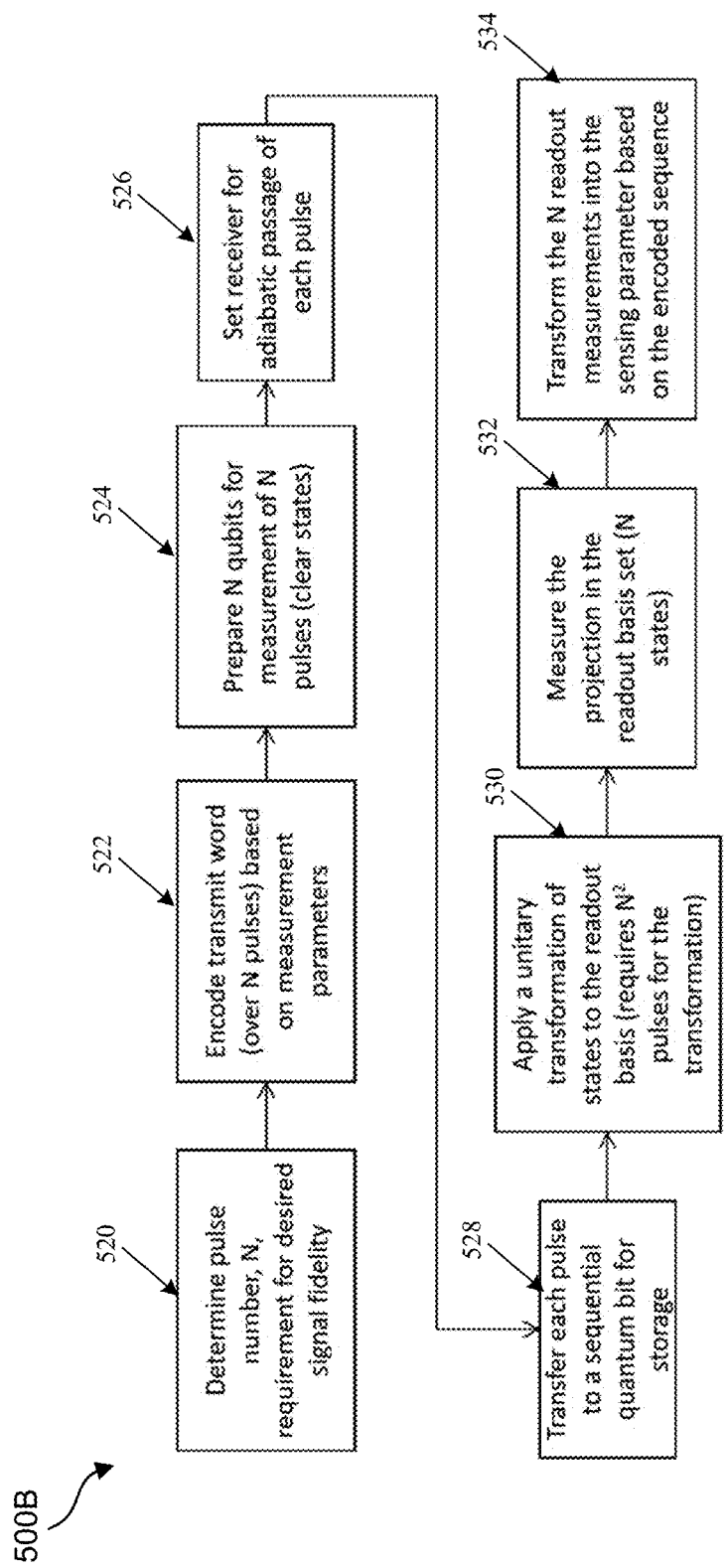
FIG. 5B is a flow diagram illustrating an example of protocol for decoding information from multiple pulses for remote-sensing applications, according to certain aspects of the disclosure.

FIG. 5B is a flow diagram illustrating an example of protocol 500B for decoding information from multiple pulses for remote-sensing applications, according to certain aspects of the disclosure. In the protocol 500B, the word (sequence of alphabet basis) used to encode the transmission is optimized based on the desired parameter (e.g., reflectivity, amplitude, phase, frequency) to measure and will vary based on platform parameters. The protocol can be implemented with many embodiments of the quantum storage, with the physical embodiment (e.g., ions, atoms, superconducting, phonons) of the qubit setting the requirements to achieve the adiabatic transfer of each pulse to the storage bit. The coherence time requirements are set by the time for receiving the N pulses, performing the unitary transformation steps, and then reading each bit in the readout basis sequence. For remote-sensing applications, this time is orders of magnitude lower than for quantum computation applications.

The protocol 500B starts at operation block 520, where the number of pulses (N) required for a desired signal fidelity is determined. At operation block 522, the transmit word (over N pulses) is encoded based on measurement parameters. At operation block 524, N qubits for measurement of N pulses (clear states) are prepared. At operation block 526, the receiver is set for an adiabatic passage of each pulse. At operation block 528, each pulse is transferred to a sequential qubit for storage. Next, at operation block 530, a unitary transformation of states to the readout basis (requires $N^2$ pulses for transformation) is applied. Then, at operation block 532, the projection in the readout basis set (N states) is measured. Finally, at operation block 534, the N readout measurements are transformed into the sensing parameter based on the encoded sequence.

Figure 6A:
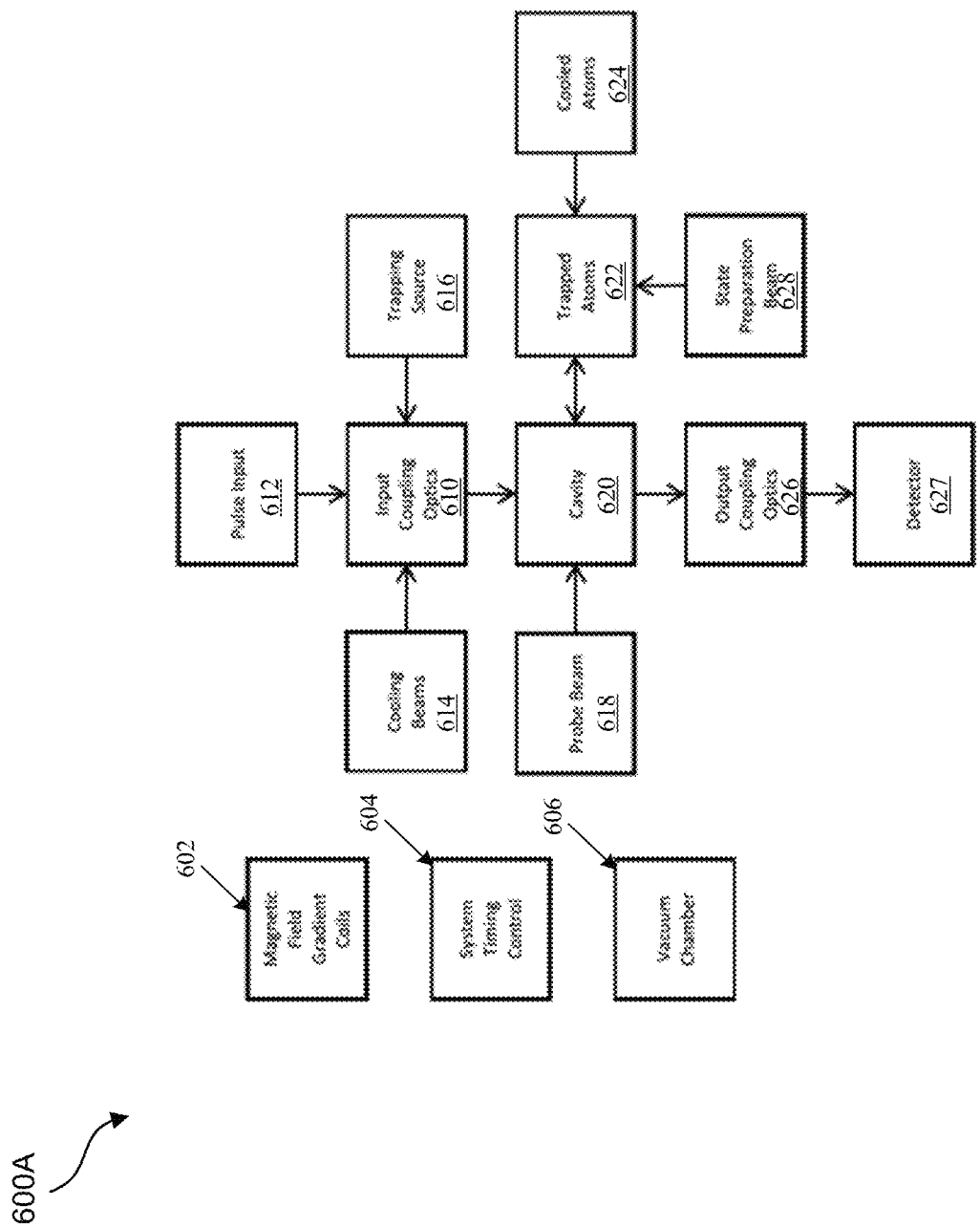
FIG. 6A is a block diagram illustrating an example of a system for implementing a receiver using trapped and cooled neutral atoms, according to certain aspects of the disclosure.

FIG. 6A is a block diagram illustrating an example of a system 600A for implementing a receiver using trapped and cooled neutral atoms, according to certain aspects of the disclosure. The optical transitions are chosen based on the coherence time and lifetime requirements for the application. Multiple levels can be chosen within a single atom, or the same level in multiple intra-cavity atoms. The synchronization requirements are set by the transmitter and pulse sequence.

The system 600A includes magnetic field gradient coils 602, system-timing control 604, vacuum chamber 606, input coupling optics 610, pulse input 612, cooling beams 614, trapping source 616, probe beam 618, cavity 620, trapped atoms 622, cooled atoms 624, output coupling optics 626, detector 627 and state preparation beam 628. The magnetic field gradient coils 602 are used to generate and change the RF field applied to the electrodes (e.g., 136 of FIG. 1) of the ion trap (e.g., 134 of FIG. 1). The system-timing control is responsible for controlling and coordinating timings of different components of the system. The vacuum chamber 606 is the process chamber in which the cavity 620 operates. The input coupling optics 610 receives and combines pulse input 612 (including sequential laser pulses, e.g., 112 of FIG. 1), trapping source 616 and cooling beams 614, and provides the combination to the cavity 620. The cavity 620 further receives the probe beam 618 (e.g., 142 of FIG. 1) and trapped atoms 622 to absorb the input pulses and the probe beam to provide qubits to the output coupling optics 626. The trapped ions 622 are prepared using cooled neutral atoms 624 and the state preparation beam 628. The output of the output coupling optics 626 is received by the detector 627 for readout.

Figure 6B:
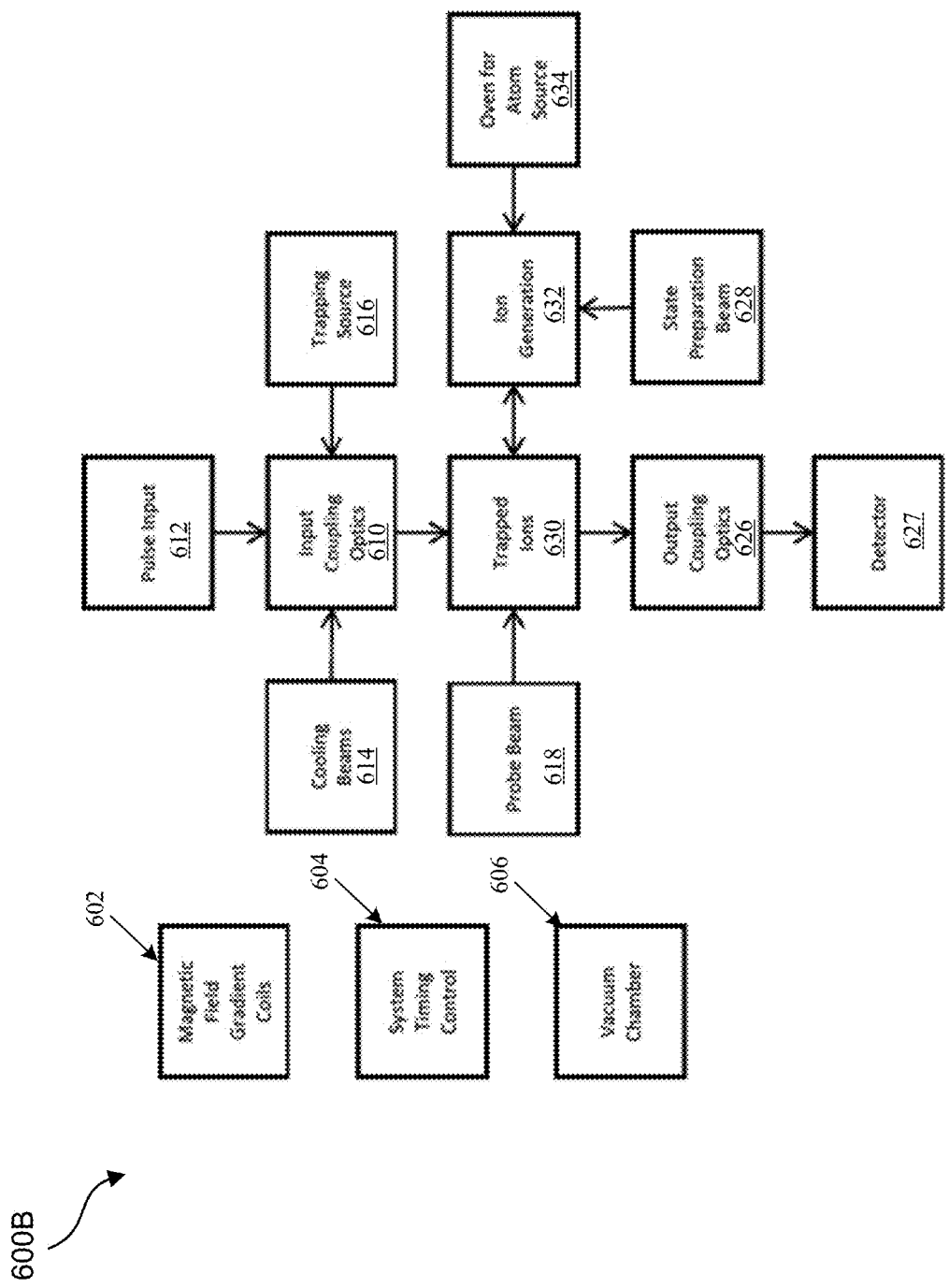
FIG. 6B is a block diagram illustrating an example of a system for implementing a receiver system using trapped and cooled ions, according to certain aspects of the disclosure.

FIG. 6B is a block diagram illustrating an example of a system 600B for implementing a receiver using trapped and cooled ions, according to certain aspects of the disclosure. In the system 600B, optical transitions are chosen based on the coherence time and lifetime requirements for the application. Multiple levels can be chosen within a single ion, or the same level in multiple ions can be used as the storage bits. The synchronization requirements are set by the transmitter and the pulse sequence.

The system 600B includes the magnetic field gradient coils 602, the system-timing control 604, the vacuum chamber 606, the input coupling optics 610, the pulse input 612, the cooling beams 614, the trapping source 616, the probe beam 618, the output coupling optics 626, the detector 627 and the state preparation beam 628, as described with respect to the system 600A of FIG. 6A. In the system 600B, the cavity 620, the trapped atoms 622 and the cooled atoms 624 of the system 600A are respectively replaced with trapped ions 630, ion generation 632 and an oven for atom source 634. The oven for atom source 634 heats up desired atoms to a high temperature (which depends on the desired atom), as required by the ion generation 632, which produces ions (plasma) to be trapped in an ion trap (e.g., 134 of FIG. 1). The ions can be held for very long times and can be rapidly prepared to keep up with new pulse sequences without pausing between (i.e., constant pulse-repetition frequency for the system). The trapped ions 630 are produced by applying the RF field generated by the magnetic field gradient coils 602 and are utilized to generate qubits by using the probe beam 618 and the output of the input coupling optics 610, which are received by the output coupling optics 626. The output of the output coupling optics 626 is received by the detector 627 for readout.

Figure 6C:
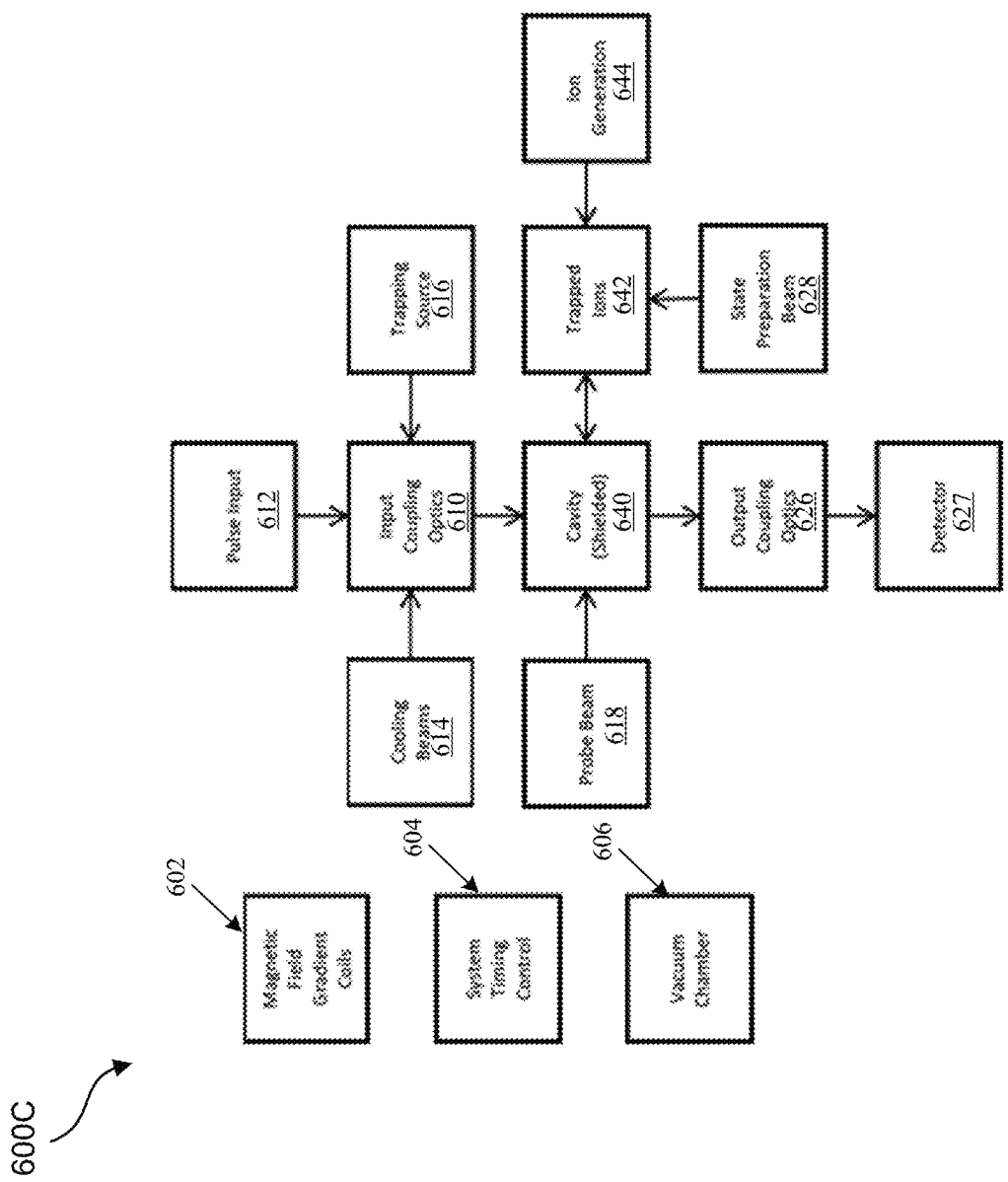
FIG. 6C is a block diagram illustrating an example of a system for implementing a receiver using trapped and cooled ions within a cavity, according to certain aspects of the disclosure.

FIG. 6C is a block diagram illustrating an example of a system 600C for implementing a receiver using trapped and cooled ions within a cavity, according to certain aspects of the disclosure. The system 600C offers some of the advantages of each of those implementations. The primary advantage is an enhanced efficiency for coupling the pulses into the storage bits and for the readout efficiency. The optical transitions are chosen based on the coherence time and lifetime requirements for the application. Multiple levels can be chosen within a single ion, or the same level in multiple ions can be used as the storage bits. The synchronization requirements are set by the transmitter and pulse sequence.

The system 600C includes the magnetic field gradient coils 602, the system-timing control 604, the vacuum chamber 606, the input coupling optics 610, the pulse input 612, the cooling beams 614, the trapping source 616, the probe beam 618, the output coupling optics 626, the detector 627 and the state preparation beam 628, as described with respect to the system 600A of FIG. 6A. In the system 600C, the cavity 620, the trapped atoms 622 and the cooled atoms 624 of the system 600A are respectively replaced with a cavity (shielded) 640, trapped ions 642 and an ion generation 644. The ion generation 644 produces ions that are sent to an ion trap to generate trapped ions 642. The generated ions can be held for very long times and can be rapidly prepared to keep up with new pulse sequences without pausing between (i.e., constant pulse-repetition frequency for the system). The ions may also be more susceptible to fields in the environment as well as virtual charges in dielectrics. Therefore, the system would use transparent conductors on the cavity 640 (the interaction medium) to shield the ions and offer nearby RF field-setting locations. Within the cavity 640, the trapped ions are utilized to generate qubits by absorbing the probe beam 618 and the output of the input coupling optics 610, which are received by the output coupling optics 626. The output of the output coupling optics 626 is received by the detector 627 for readout.

Figure 6D:
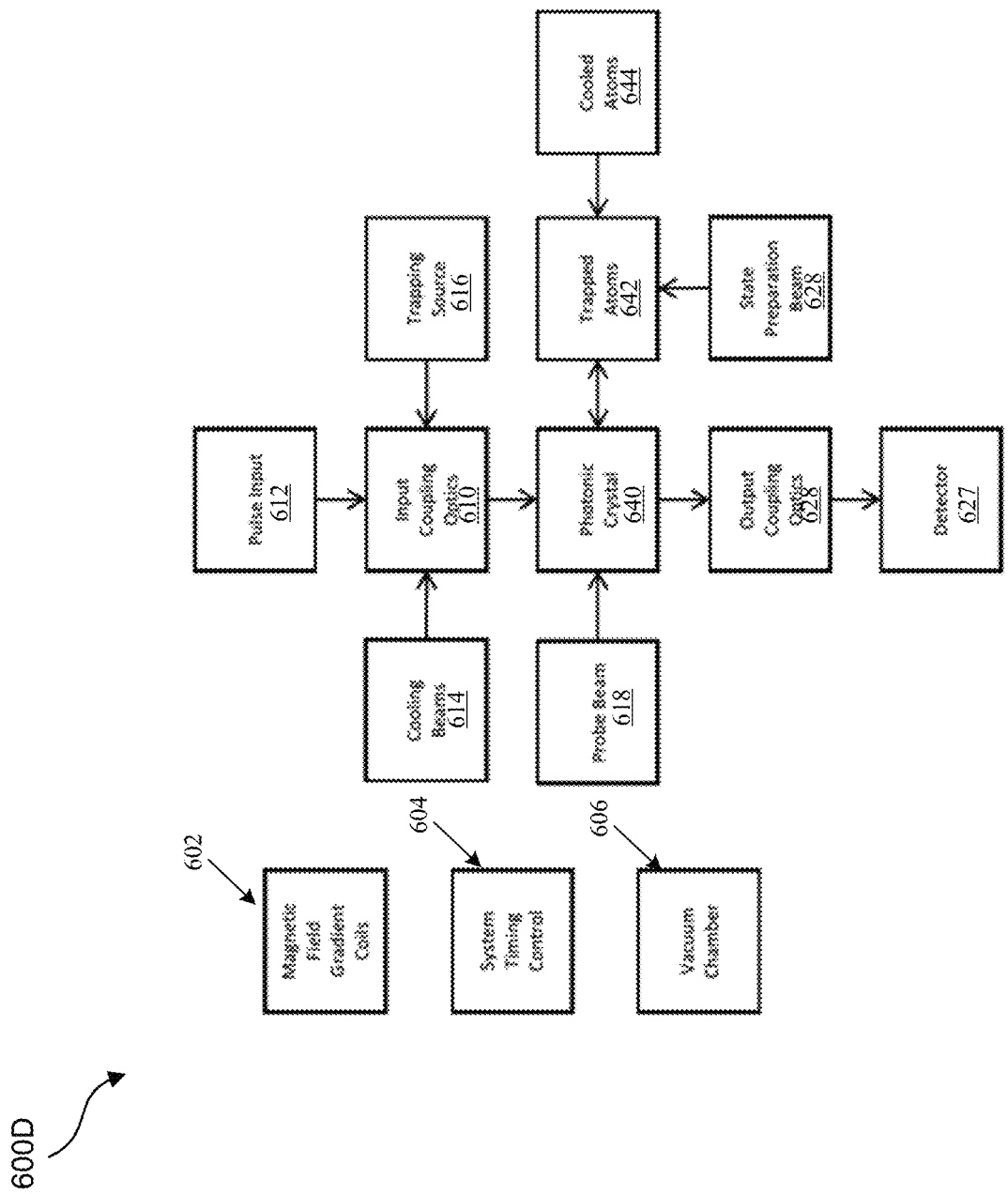
FIG. 6D is a block diagram illustrating an example of a system for implementing a receiver using trapped and cooled atoms with a nearby photonic crystal, according to certain aspects of the disclosure.

FIG. 6D is a block diagram illustrating an example of a system 600D for implementing a receiver using trapped and cooled atoms with a nearby photonic crystal, according to certain aspects of the disclosure. The system 600D includes the magnetic field gradient coils 602, the system-timing control 604, the vacuum chamber 606, the input coupling optics 610, the pulse input 612, the cooling beams 614, the trapping source 616, the probe beam 618, the output coupling optics 626, the detector 627 and the state preparation beam 628, as described with respect to the system 600A of FIG. 6A. In the system 600D, the cavity 620, the trapped atoms 622 and the cooled atoms 624 of the system 600A are respectively replaced with a photonic crystal 640, trapped atoms 642 and cooled atoms 644. The trapped atoms 642 and cooled atoms 642 are similar to the trapped atoms 622 and cooled atoms 624 of FIG. 6A, and the photonic crystal 640 replaces the cavity 620. Within the photonic crystal 640, the trapped ions are utilized to generate qubits by absorbing the input pulses and using the probe beam to control the desired ion transition. The probe beam 618 is also used to read out the state with the output coupling optics 610, which are received by the output coupling optics 626. The output of the output coupling optics 626 is received by the detector 627 for readout.

Figure 6E:
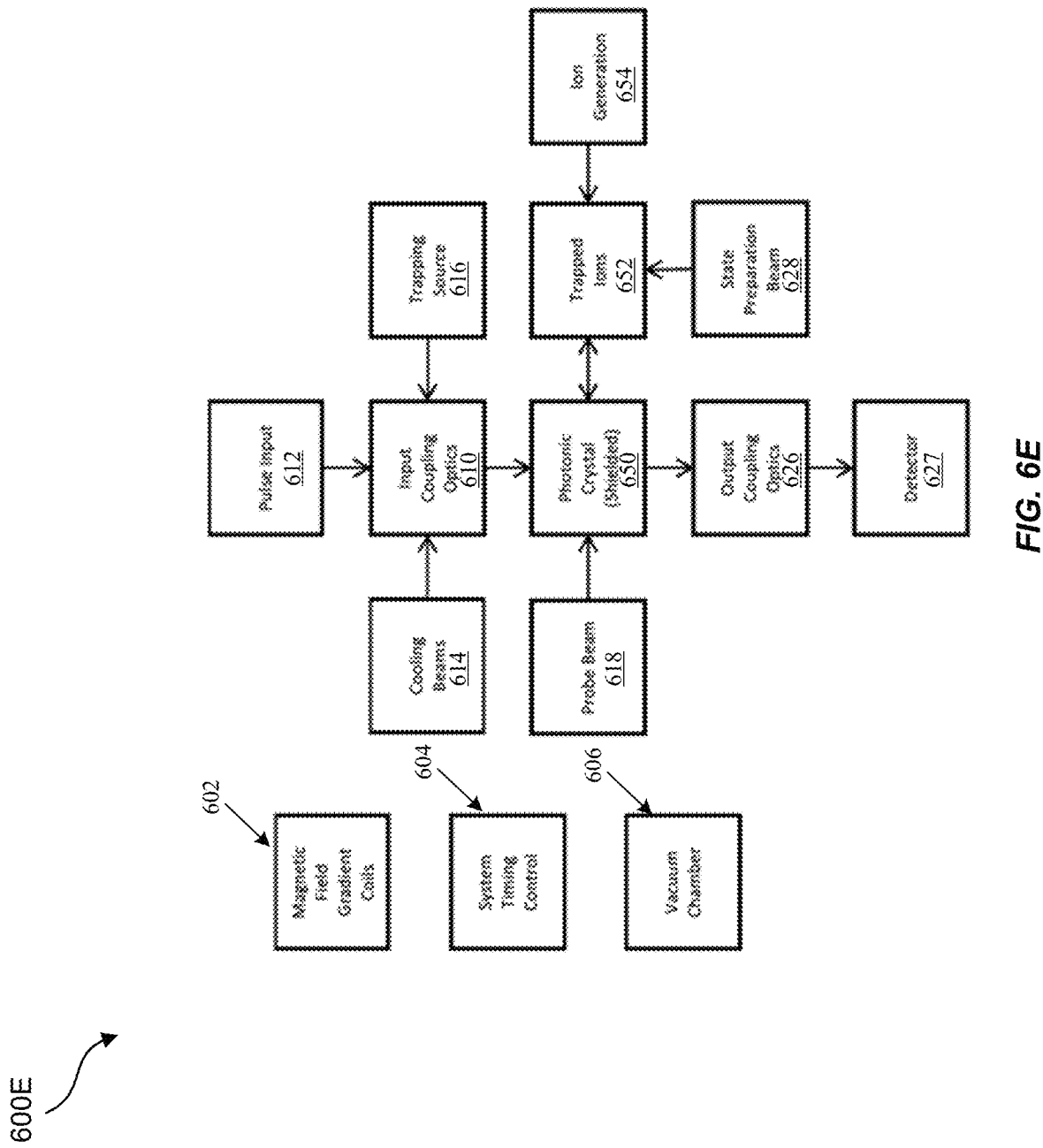
FIG. 6E is a block diagram illustrating an example of a system for implementing a receiver using trapped and cooled ions near a photonic crystal, according to certain aspects of the disclosure.

FIG. 6E is a block diagram illustrating an example of a system 600E for implementing a receiver system using trapped and cooled ions near a photonic crystal, according to certain aspects of the disclosure. The system 600E includes the magnetic field gradient coils 602, the system-timing control 604, the vacuum chamber 606, the input coupling optics 610, the pulse input 612, the cooling beams 614, the trapping source 616, the probe beam 618, the output coupling optics 626, the detector 627 and the state preparation beam 628, as described with respect to the system 600A of FIG. 6A. In the system 600E, the cavity 620, the trapped atoms 622 and the cooled atoms 624 of the system 600A are respectively replaced with a shielded photonic crystal 650 (interaction medium), trapped ions 652 and ion generation 654. The trapped ions 652 and ion generation 654 are similar to the trapped ions 642 and ion generation 644 of FIG. 6C, and the shielded photonic crystal 650 replaces the photonic crystal 640 of FIG. 6D. Within the photonic crystal 650, the trapped ions are utilized to generate qubits by scattering the probe beam 618 and the output of the input coupling optics 610, which are received by the output coupling optics 626. The output of the output coupling optics 626 is received by the detector 627 for readout.

The system 600E offers additional advantages over the ions in a cavity. In addition to an enhanced efficiency for coupling the pulses into the storage bits and for the readout efficiency, the photonic crystal provides a hemisphere of optical access to the ions. The optical transitions are chosen based on the coherence time and lifetime requirements for the application. Multiple levels can be chosen within a single ion, or the same level in multiple ions can be used as the storage bits. The synchronization requirements are set by the transmitter and pulse sequence. The generated ions can be held for very long times and can be rapidly prepared to keep up with new pulse sequences without pausing between (i.e., constant pulse-repetition frequency for the system). The ions are also more susceptible to fields in the environment as well as virtual charges in dielectrics. Therefore, the system 600E would use transparent conductors on the photonic crystal to shield the ions and offer a nearby RF field-setting location.

Figure 6F:
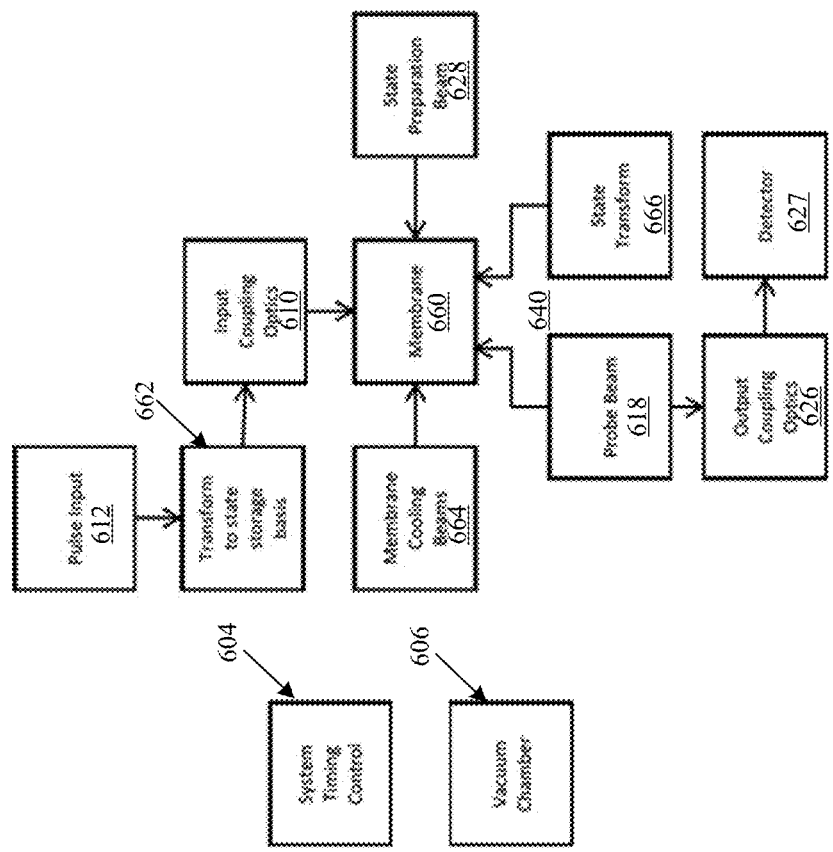
FIG. 6F is a block diagram illustrating an example of a system for implementing a receiver using light coupled to a resonant vibrational mode in a membrane, according to certain aspects of the disclosure.

FIG. 6F is a block diagram illustrating an example of a system for implementing a receiver using light coupled to a resonant vibrational mode in a membrane, according to certain aspects of the disclosure. The system 600F includes the system-timing control 604, the vacuum chamber 606, the input coupling optics 610, the pulse input 612, the probe beam 618, the output coupling optics 626, the detector 627 and the state preparation beam 628, as described with respect to the system 600A of FIG. 6A. In the system 600F, the cavity 620 is replaced with a membrane 660. The pulse input 612 is coupled to a transform to state storage basis in a transform to state storage basis block 662, which is in turn coupled to the input coupling optics 610. The membrane 660 (interaction medium) is cooled by the membrane cooling beams 664. The membrane 660 receives a state preparation beam 628, a state transform 666, the probe beam 618 and the output of the input coupling optics 610. The membrane 660 uses a phonon mode as the qubit storage mechanism. Several modes within the membrane 660 can be used, or similar modes in separate membranes. In both cases, modulated light can be used to drive the mixing between modes needed for applying the basis transformations. In addition, light would be used to mix with the incoming pulses to enable an efficient transfer of the state to the phonon mode. In this way, the needed number of qubits and physical layout can be engineered using lithography to build the number of bits needed for the application. The qubits generated by the membrane 660 are received by the output coupling optics 626. The output of the output coupling optics 626 is received by the detector 627 for readout. In one or more aspects, the input coupling optics 610 and/or the output coupling optics 626 can be implemented using an optical Faraday circulator.

Figure 6G:
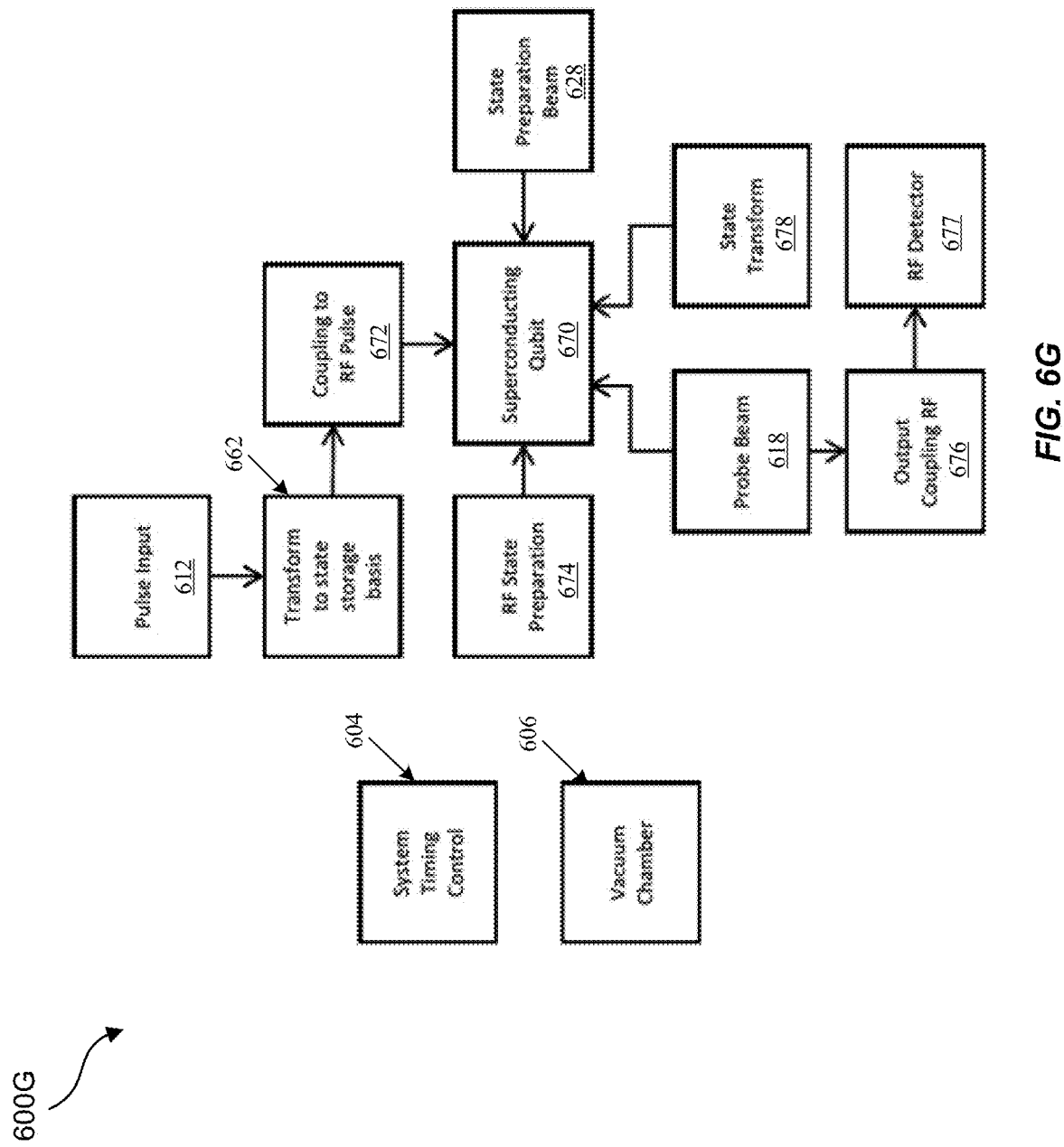
FIG. 6G is a block diagram illustrating an example of a system for implementing a receiver using light coupled to a superconducting quantum bit (qubit), according to certain aspects of the disclosure.

FIG. 6G is a block diagram illustrating an example of a system 600G for implementing a receiver using light coupled to a superconducting qubit, according to certain aspects of the disclosure. The system 600G uses an intermediary receiver to create the required RF pulse to transfer the state to each qubit. While this introduces an additional efficiency penalty in the initial receiver, the state manipulation can be performed with high efficiency in the RF domain. RF pulses are used for the state manipulation, and then readout is done in the RF domain. The system 600G includes the system-timing control 604, the vacuum chamber 606, the pulse input 612 and the probe beam 618, as described with respect to the system 600A of FIG. 6A. In the system 600G, the pulse sequences of the pulse input 612 are transformed to state storage basis block 662, which is received by a coupling to RF pulse block 672. The system 600G further includes the superconducting qubit generator 670, which receives outputs of RF state preparation 674 and coupling to RF pulse block 672, state preparation beam 628, a state transform block 678 and the probe beam 618 to generate qubits. The qubits generated by the superconducting qubit generator 670 (interaction medium) are received by the output coupling RF 676. The output of the output coupling RF 676 is received by the detector 627 for readout. In one or more aspects, the coupling to RF pulse 672 and/or the output coupling RF 726 can be implemented using an RF circulator.

Figure 6H:
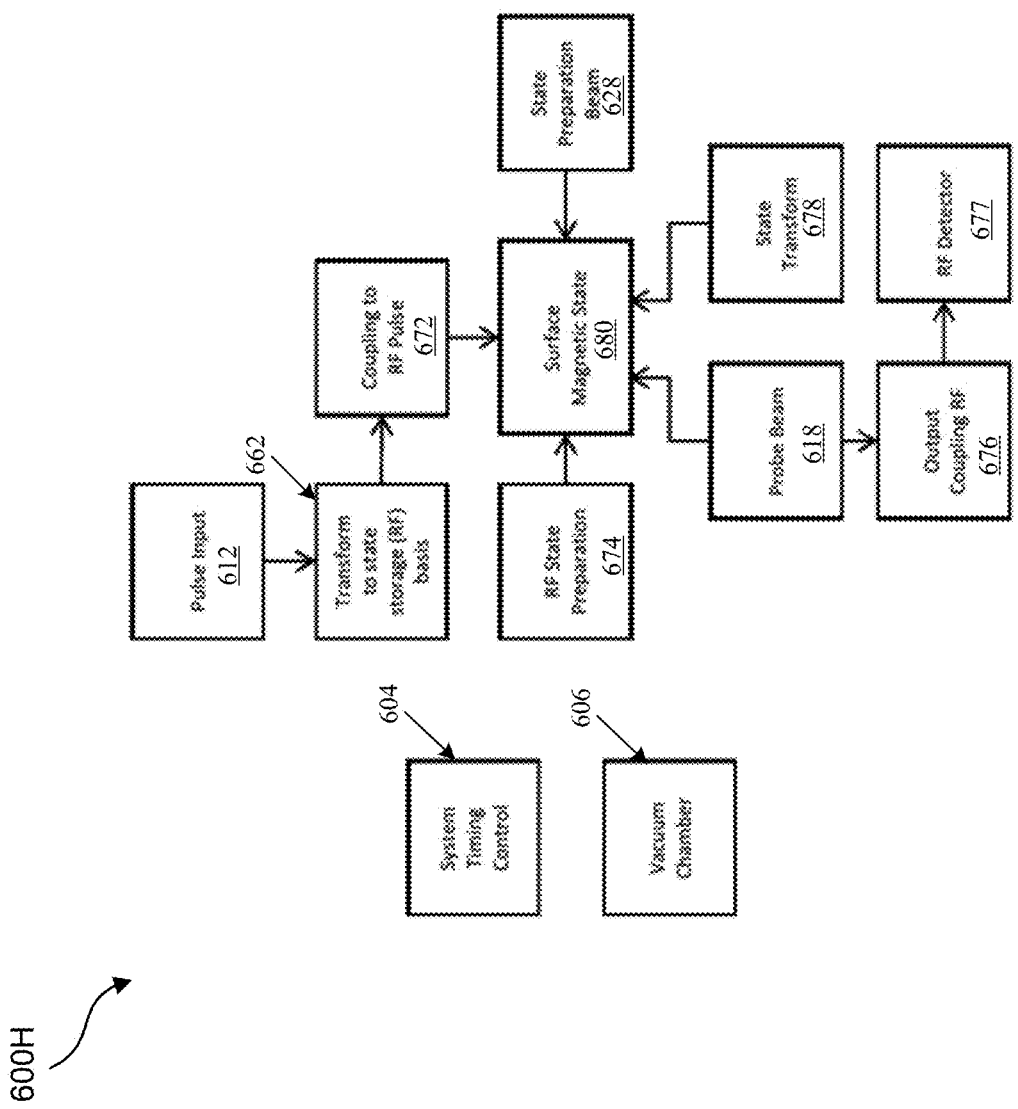
FIG. 6H is a block diagram illustrating an example of a system for implementing a receiver using light coupled to a surface magnetic state, according to certain aspects of the disclosure.

FIG. 6H is a block diagram illustrating an example of a system 600H for implementing a receiver using light coupled to a surface magnetic state, according to certain aspects of the disclosure. The system 600H is similar to the system 600G, except that the superconducting qubit generator 670 is replaced by a surface magnetic state 680 (as an interaction medium). The system 600H uses an intermediary receiver to create the required RF pulse to transfer the state to each qubit. While this introduces an additional efficiency penalty in the initial receiver, the state manipulation can be performed with high efficiency in the RF domain. RF pulses are used for the state manipulation, and then readout is done in the RF. The additional advantage of this implementation is the scaling to large numbers of bits with simplified error correction in the state manipulation. The advantage is realized as the number of bits grows past 100.

Figure 7:
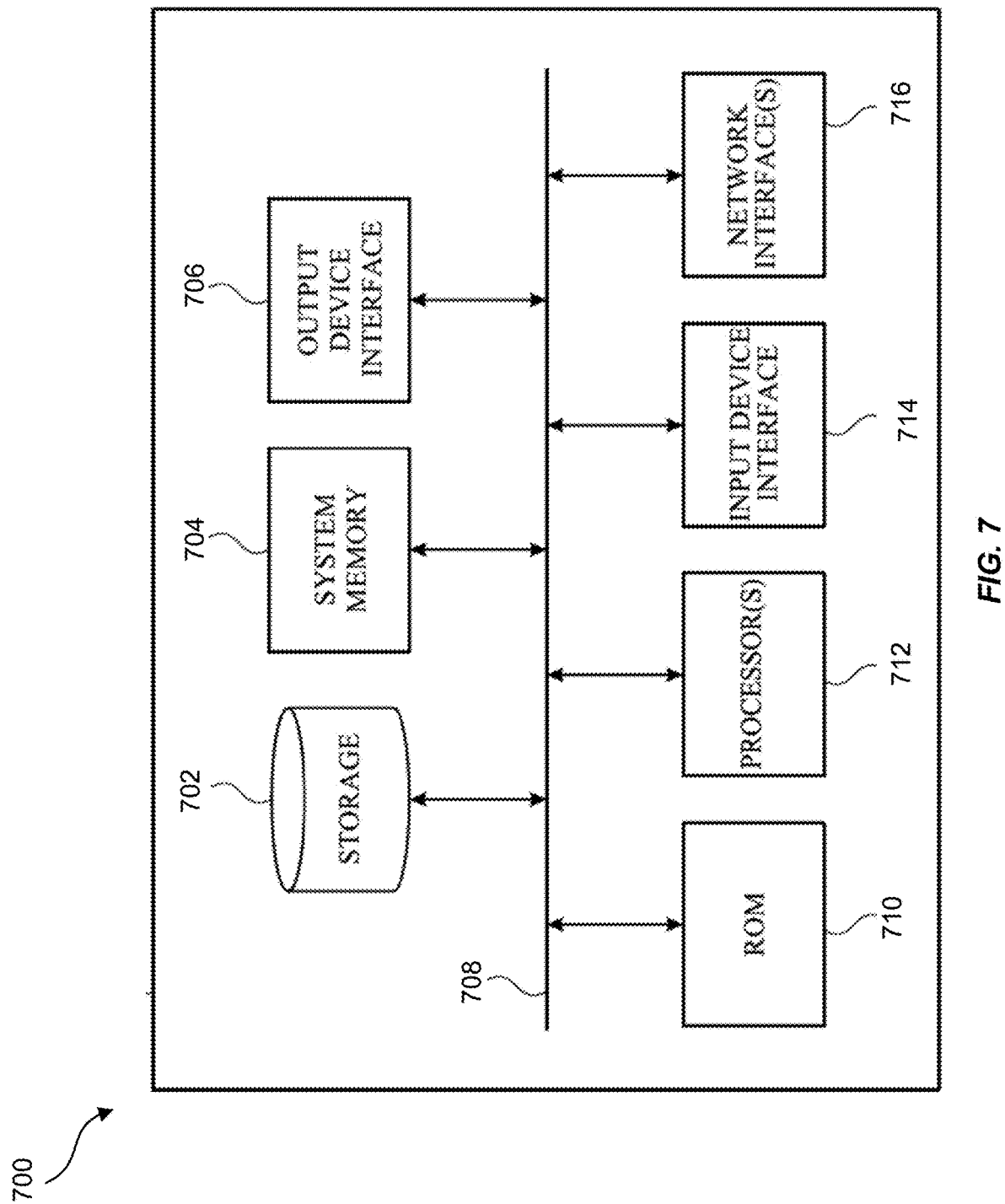
FIG. 7 is a block diagram illustrating an example of an electronic system in which some aspects of the subject technology are implemented.

FIG. 7 is a block diagram illustrating an example of an electronic system 700 in which some aspects of the subject technology are implemented. Electronic system 700 includes bus 708, processor(s) 712, system memory 704, read-only memory (ROM) 710, permanent storage device 702, input device interface 714, output device interface 706, and network interface 716, or subsets and variations thereof. Bus 708 collectively represents all system, peripheral, and chipset buses that communicatively connect the numerous internal devices of electronic system 700. In one or more implementations, bus 708 communicatively connects processor(s) 712 with ROM 710, system memory 704, and permanent storage device 702. From these various memory units, processor(s) 712 retrieve(s) instructions to execute and data to process in order to execute the processes of the subject disclosure. The processor(s) 712 can be a single processor or a multicore processor in different implementations. In some aspects, the processor(s) 712 implement(s) the methods, processes, algorithms and protocols of the subject technology—for example, methods of FIGS. 4A, 4B, 4C, 5A and 5B.

ROM 710 stores static data and instructions that are needed by processor(s) 712 and other modules of the electronic system. Permanent storage device 702, on the other hand, is a read-and-write memory device. This device is a nonvolatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk or flash drive, and its corresponding disk drive) as permanent storage device 702. Like permanent storage device 702, system memory 704 is a read-and-write memory device. However, unlike storage device 702, system memory 704 is a volatile read-and-write memory device, such as random access memory. System memory 704 stores any of the instructions and data that processor(s) 712 need(s) at runtime. In one or more implementations, the processes of the subject disclosure, for example, the trained ROM, are stored in system memory 704, permanent storage device 702, and/or ROM 710. From these various memory units, processor(s) 712 retrieve(s) instructions to execute and data to process in order to execute the processes of one or more implementations.

Bus 708 also connects to input device interface 714 and output device interface 706. Input device interface 714 enables a user to communicate information and select commands to the electronic system. Input devices used with input device interface 714 include, for example, alphanumeric keyboards and pointing devices (also called "cursor-control devices"). Output device interface 706 enables, for example, the display of images generated by electronic system 700. Output devices used with output device interface 706 include, for example, printers and display devices such as a liquid crystal display, a light-emitting diode (LED) display, an organic LED display, a flexible display, a flat-panel display, a solid-state display, a projector, or any other device for outputting information. One or more implementations may include devices that function as both input and output devices, such as touchscreens. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local-area network, a wide-area network, or an Intranet, or a network of networks, such as the Internet). Any or all components of electronic system 700 can be used in conjunction with the subject disclosure.

In some aspects, the subject technology is related to remote sensing and communications technology, more particularly to superadditivity for remote sensing and communication. In some aspects, the subject technology may be used in various markets, including, for example, and without limitation, the sensor technology, communication systems and quantum system markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of an example approach. Based upon design preferences, it is understood that the specific order or hierarchy of blocks in the processes may be rearranged, or that all illustrated blocks may or may not be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meanings unless otherwise explicitly and clearly defined by the patentee. If there is any conflict in the usage of a word or term in this specification and one or more patents or other documents that may be incorporated herein by reference, the definition that is consistent with this specification should be adopted.

What is claimed is:

1. A system comprising:
    a coupling optics configured to direct a plurality of input pulses received over a communication channel to an interaction medium;
    a probe beam entering the interaction medium at an angle and configured to perform state preparation and manipulation; and
    a detector configured to readout output light of the interaction medium,
    wherein orthogonality states of symbols represented by the plurality of input pulses are affected by the communication channel, and
    the interaction medium is configured to provide output light via local entanglement of the plurality of input pulses and the probe beam.

2. The system of claim 1, wherein the plurality of input pulses comprises N state-prepared and timing-controlled sequential laser pulses, wherein N comprises an integer greater than one.

3. The system of claim 1, wherein the communication channel comprises a noisy and lossy free-space channel.

4. The system of claim 1, wherein the coupling optics comprise a circulator configured to direct the output light of the interaction medium to the detector.

5. The system of claim 1, wherein the output light of the interaction medium comprises quantum bits (qubits) ready for measurement by the detector.

6. The system of claim 1, wherein the interaction medium comprises a cavity including an ion trap configured to produce a plurality of ions to scatter the plurality of input pulses and the probe beam.

7. The system of claim 6, wherein the cavity comprises dielectric mirrors formed by a coating of a low-loss, transparent conductor.

8. The system of claim 7, wherein the cavity comprises a shielded cavity.

9. The system of claim 1, wherein the interaction medium comprises a photonic crystal, and wherein trapped atoms are used to scatter the plurality of input pulses and the probe beam.

10. The system of claim 1, wherein the interaction medium comprises a shielded photonic crystal, and wherein trapped ions are used to scatter the plurality of input pulses and the probe beam.

11. The system of claim 1, wherein the interaction medium comprises superconducting qubits using radiofrequency (RF) state preparation and a state-preparation laser beam.

12. The system of claim 1, wherein the interaction medium comprises a surface magnetic state using an RF state preparation and a state-preparation laser beam.

13. The system of claim 1, wherein the interaction medium comprises a membrane configured to couple the plurality of input pulses and the probe beam to a resonant vibrational mode.

14. A method for superadditivity in communication, the method comprising:
    directing a plurality of input pulses received over a communication channel to an interaction medium comprising at least one of a cavity including an ion trap, a photonic crystal, a shielded photonic crystal, a membrane, or a surface magnetic state;
    using a probe beam to perform state preparation and manipulation in the interaction medium allowing local entanglement of the plurality of input pulses and the probe beam; and
    reading out, by a detector, output light of the interaction medium,
    wherein the communication channel comprises a noisy and lossy channel that affects orthogonality states of symbols represented by the plurality of input pulses.

15. The method of claim 14, wherein the interaction medium comprises the cavity including the ion trap, and wherein the method further comprises producing a plurality of ions to absorb the plurality of input pulses and the probe beam.

16. The method of claim 14, wherein the interaction medium comprises the photonic crystal, and wherein the method further comprises cooling and trapping atoms and using the trapped atoms to absorb the plurality of input pulses and the probe beam.

17. The method of claim 14, wherein the interaction medium comprises the membrane, and wherein the method further comprises coupling the plurality of input pulses and the probe beam to a resonant vibrational mode.

18. The method of claim 14, wherein the interaction medium comprises the shielded photonic crystal, and wherein the method further comprises using trapped ions to absorb the plurality of input pulses and the probe beam.

19. A method for superadditivity in remote sensing, the method comprising:
    directing a plurality of input pulses through a communication channel to a target;
    receiving from the target over the communication channel a plurality of reflected pulses;
    directing the reflected pulses to an interaction medium comprising at least one of a cavity including an ion trap, a photonic crystal, a shielded photonic crystal, a membrane, or a surface magnetic state;

using a probe beam to perform state preparation and manipulation of the reflected pulses in the interaction medium by allowing local entanglement of the plurality of reflected pulses and the probe beam; and reading out, by a detector, output light of the interaction medium, wherein the communication channel comprises a noisy and lossy channel that affects orthogonality states of symbols represented by the plurality of input pulses.

20. The method of claim 19, wherein the plurality of input pulses comprises N state-prepared and timing-controlled sequential laser pulses, N comprises an integer greater than one, and the communication channel comprises a noisy and lossy free-space channel.

* * * * *